(12) United States Patent
Kim et al.

(10) Patent No.: US 12,476,255 B2
(45) Date of Patent: Nov. 18, 2025

(54) POSITIVE ELECTRODE CURRENT COLLECTOR

(71) Applicant: U&S ENERGY, INC., Cheonan-si (KR)

(72) Inventors: Kyung Joon Kim, Daejeon (KR); Seung Ho Choi, Daejeon (KR); Young Hun Jin, Gyeryong-si (KR)

(73) Assignee: U&S ENERGY, INC., Cheonan-si (KR)

( * ) Notice: Subject to any disclaimer, the term of this patent is extended or adjusted under 35 U.S.C. 154(b) by 746 days.

(21) Appl. No.: 17/783,343

(22) PCT Filed: Nov. 17, 2020

(86) PCT No.: PCT/KR2020/016146
§ 371 (c)(1),
(2) Date: Jun. 8, 2022

(87) PCT Pub. No.: WO2021/132886
PCT Pub. Date: Jul. 1, 2021

(65) Prior Publication Data
US 2023/0027109 A1    Jan. 26, 2023

(30) Foreign Application Priority Data
Dec. 24, 2019   (KR) .................. 10-2019-0173632

(51) Int. Cl.
*H01M 4/66*    (2006.01)
*H01M 10/052*  (2010.01)
*H01M 10/42*   (2006.01)
*H01M 50/581*  (2021.01)
*H01M 4/02*    (2006.01)

(52) U.S. Cl.
CPC ........ *H01M 4/661* (2013.01); *H01M 10/052* (2013.01); *H01M 10/4235* (2013.01);
(Continued)

(58) Field of Classification Search
CPC ............... H01M 4/661; H01M 10/052; H01M 10/4235; H01M 50/581; H01M 2004/028;
(Continued)

(56) References Cited

U.S. PATENT DOCUMENTS 4,447,509 A * 5/1984 Maskalick .............. H01M 4/80
                                                    29/623.5
10,985,377 B2   4/2021 Liang et al.
(Continued)

FOREIGN PATENT DOCUMENTS

CN    107123812 A    9/2017
CN    108777308 A    11/2018
(Continued)

*Primary Examiner* — Cynthia K Walls
(74) *Attorney, Agent, or Firm* — NKL LAW; Jae Youn Kim

(57) ABSTRACT

Proposed is a current collector for a positive electrode that substitutes for metal foil and includes a polymer film made of a nonmetal, nonconductor material, and an aluminum conductive material configured to define an outermost surface of the current collector for a positive electrode by being formed or applied, with a thickness of 0.25 to 0.6 μm, onto at least one of upper and lower surfaces of the polymer film, in which the conductive material serves as an electrochemical fuse or performs a function of blocking or reducing short-circuit current in the event of an internal short circuit or an external short circuit.

14 Claims, 12 Drawing Sheets

(52) U.S. Cl.
CPC .... *H01M 50/581* (2021.01); *H01M 2004/028* (2013.01); *H01M 2200/103* (2013.01)

(58) Field of Classification Search
CPC ........... H01M 2200/103; H01M 4/667; H01M 50/583; H01M 4/02; H01M 4/66; H01M 50/572; H01M 4/669; H01M 10/42; H01G 11/68; H01G 11/70; Y02E 60/10
See application file for complete search history.

(56) References Cited

U.S. PATENT DOCUMENTS

2016/0043405 A1* 2/2016 Miyatake ............ H01M 10/613
429/233
2019/0319312 A1* 10/2019 Morin ............... H01M 10/0525

FOREIGN PATENT DOCUMENTS

| | | |
|---|---|---|
| CN | 110247055 A | 9/2019 |
| EP | 3522274 A1 | 8/2019 |
| JP | 09-120818 A | 5/1997 |
| JP | 11-067188 A | 3/1999 |
| JP | 11-102711 A | 4/1999 |
| JP | 2005-108835 A | 4/2005 |
| JP | 2009-059571 A | 3/2009 |
| JP | 2010-238410 A | 10/2010 |
| KR | 10-2006-0102745 A | 9/2006 |
| KR | 10-1036070 B1 | 5/2011 |
| KR | 10-2011-0109769 A | 10/2011 |
| KR | 101342696 B1 | 12/2013 |
| KR | 10-2015-0035205 A | 4/2015 |

\* cited by examiner

POSITIVE ELECTRODE CURRENT COLLECTOR

TECHNICAL FIELD

The present invention relates to a current collector for a positive electrode, and more particularly, to a current collector for a positive electrode, in which a polymer film is plated with aluminum metal and thus serves as an electrochemical fuse that prevents overheating of a battery, blocks a short-circuit current path, or reduces short-circuit current in the event of a short circuit.

BACKGROUND ART

As technical research and demands for mobile devices increase, there are rapidly increasing demands for secondary batteries as energy sources. Among the secondary batteries, lithium secondary batteries have been commercially available and have high energy density and action potential and a low self-discharge rate.

A lithium metal secondary battery is the first secondary battery that has been commercially available. The lithium metal secondary battery uses lithium metal as a negative electrode. However, the lithium metal secondary battery has a problem in that a lithium dendrite formed on a surface of a lithium metal negative electrode causes expansion of volume of a cell, gradual deterioration in capacity and energy density, a short circuit caused by consistent growth of the dendrite, a decrease in cycle lifespan, and deterioration in cell stability (explosion and ignition). For this reason, the production of the lithium metal secondary battery was stopped in a just few years after the lithium metal secondary battery was commercially available. Therefore, there has been used a carbon-based negative electrode that is more suitable than lithium metal and can store lithium in an ionic state in a lattice or vacant space. The use of the carbon-based negative electrode allows the lithium secondary battery to be properly commercially available and come into wide use.

The lithium secondary battery is mainly made of carbon-based or non-carbon-based negative electrode materials up to now. The development of the negative electrode material is mostly focused on carbon-based materials (graphite, hard carbon, soft carbon, etc.) and non-carbon-based materials (silicon, tin, titanium oxide, etc.).

Meanwhile, recently, as portable electronic devices and information communication devices are miniaturized, the lithium secondary battery is significantly expected to be used as an ultra-small power system for operating the devices.

Moreover, recently, research and development have been actively conducted on polymer-based electronic devices and elements using advantages such as flexibility, low cost, and ease of manufacturing. Therefore, to use the miniaturized device, it is necessary to reduce a thickness or weight of the battery while maintaining energy density or performance of the lithium secondary battery.

In addition, even though the thickness or weight of the lithium secondary battery is reduced, a current path needs to be blocked or short-circuit current needs to be reduced in the event of a short circuit in order to improve safety of the lithium secondary battery.

The present applicant proposes the present invention to solve the above-mentioned problems.

DISCLOSURE

Technical Problem

The present invention has been made in an effort to solve the above-mentioned problems, and an object of the present invention is to provide a current collector for a positive electrode, that may have a reduced thickness or weight in comparison with a current collector made of metal foil and serve as a fuse in the event of an internal short circuit or an external short circuit, thereby preventing an increase in temperature and improving stability of a battery.

Technical Solution

To achieve the above-mentioned object, the present invention provides a current collector for a positive electrode, which substitutes for metal foil, the current collector for a positive electrode including: a polymer film made of a nonmetal, nonconductor material; and an aluminum conductive material configured to define an outermost surface of the current collector for a positive electrode by being formed or applied, with a thickness of 0.25 to 0.6 µm, onto at least one of upper and lower surfaces of the polymer film, in which the conductive material serves as an electrochemical fuse or performs a function of blocking or reducing short-circuit current in the event of an internal short circuit or an external short circuit.

Further, the present invention provides a current collector for a positive electrode, which substitutes for metal foil, the current collector for a positive electrode including: a polymer film made of a nonmetal, nonconductor material; and an aluminum conductive material configured to define an outermost surface of the current collector for a positive electrode by being formed or applied, with a thickness of 0.25 to 0.6 µm, onto at least one of upper and lower surfaces of the polymer film, in which in the event of an internal short circuit or an external short circuit, the conductive material reacts with an electrolyte and is corroded or broken in a thickness direction over an entire thickness of the conductive material so as to block a short-circuit current path or reduce short-circuit current.

In addition, the present invention provides a current collector for a positive electrode, which substitutes for metal foil, the current collector for a positive electrode including: a polymer film made of a nonmetal, nonconductor material; and an aluminum conductive material configured to define an outermost surface of the current collector for a positive electrode by being formed or applied, with a thickness of 0.25 to 0.6 µm, onto at least one of upper and lower surfaces of the polymer film, in which in the event of an internal short circuit or an external short circuit, electric potential of the current collector for a positive electrode decreases to negative electrode electric potential, and the conductive material is corroded or broken in a thickness direction over an entire thickness so as to block a short-circuit current path or reduce short-circuit current.

The current collector for a positive electrode may include a metal piece provided on at least one of the upper and lower surfaces of the polymer film and electrically connected to the conductive material, and the conductive material may be provided between the metal piece and the polymer film.

The metal piece may be configured as aluminum foil or SUS 316L foil.

The current collector for a positive electrode may include a lead tab joined or connected to the metal piece.

An insulating polymeric layer may be provided between the conductive material and the metal piece.

A plurality of nano-sized pores may be formed in the conductive material formed or applied onto the surface of the polymer film.

The metal piece may be provided on a surface of any one of the conductive materials formed on the upper and lower surfaces of the polymer film, an insulating polymeric layer may be provided on a surface of the conductive material on any one of the upper and lower surfaces of the polymer film that faces the metal piece, and a lead tab may be joined or connected to the insulating polymeric layer that faces the metal piece.

The conductive material may be provided on any one of the upper and lower surfaces of the polymer film, and the conductive material, the insulating polymeric layer, and the metal piece may be provided at the same side with respect to the upper or lower surface of the polymer film.

A lead tab may be joined or connected to the polymer film and provided on one of the upper and lower surfaces of the polymer film that faces the metal piece.

The current collector for a positive electrode may include: a metal piece provided on any one of the upper and lower surfaces of the polymer film and electrically connected to the conductive material; and an insulating polymeric layer provided on one of the upper and lower surfaces of the polymer film that faces the metal piece, and the conductive material may be provided between the insulating polymeric layer and the polymer film.

The current collector for a positive electrode may include a lead tab joined or connected to the insulating polymeric layer.

Advantageous Effects

The current collector for a positive electrode according to the present invention uses the polymer film made of a nonconductor instead of metal foil, and the conductive material is formed, as a coating or plating layer, on at least one of the two opposite upper and lower surfaces of the polymer film. Therefore, it is possible to reduce the thickness or weight in comparison with the current collector having the metal foil.

The current collector for a positive electrode according to the present invention has a resistance value larger than a resistance value of the current collector having the metal foil in the event of an internal short circuit or an external short circuit. Further, because the flow of current may be hindered by corrosion of the conductive material formed on one surface of the polymer film or a resultant product of the electrochemical reaction, it is possible to reduce short-circuit current in the event of a short circuit. Further, it is possible to improve safety of the battery by preventing an increase in temperature of the battery.

The current collector for a positive electrode according to the present invention may increase energy density and improve safety of the secondary battery and ensure safety of the battery in the event of a short circuit.

BEST MODE

Figure 1:
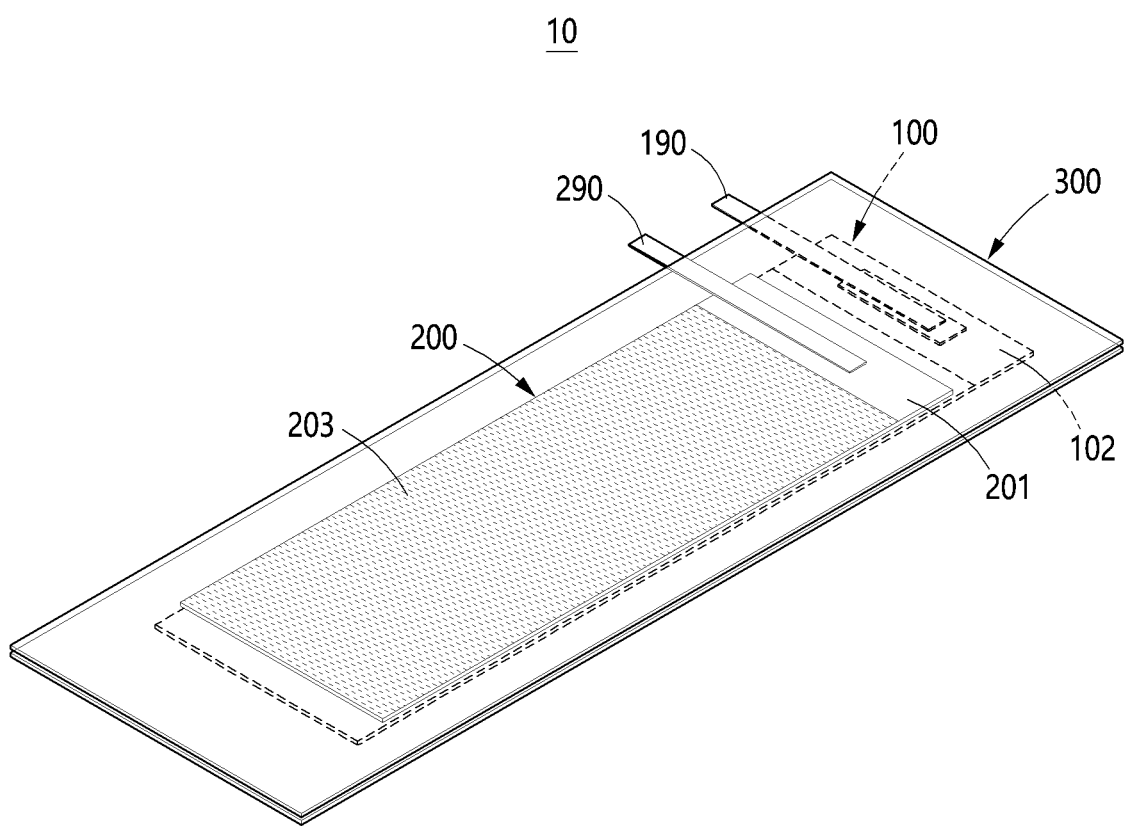
FIG. 1 is a perspective view illustrating an electrode assembly including a current collector for a positive electrode according to the present invention.

Hereinafter, embodiments according to the present invention will be described in detail with reference to the accompanying drawings. However, the present invention is not restricted or limited by the embodiments. Like reference numerals indicated in the respective drawings refer to like members.

Figure 2:
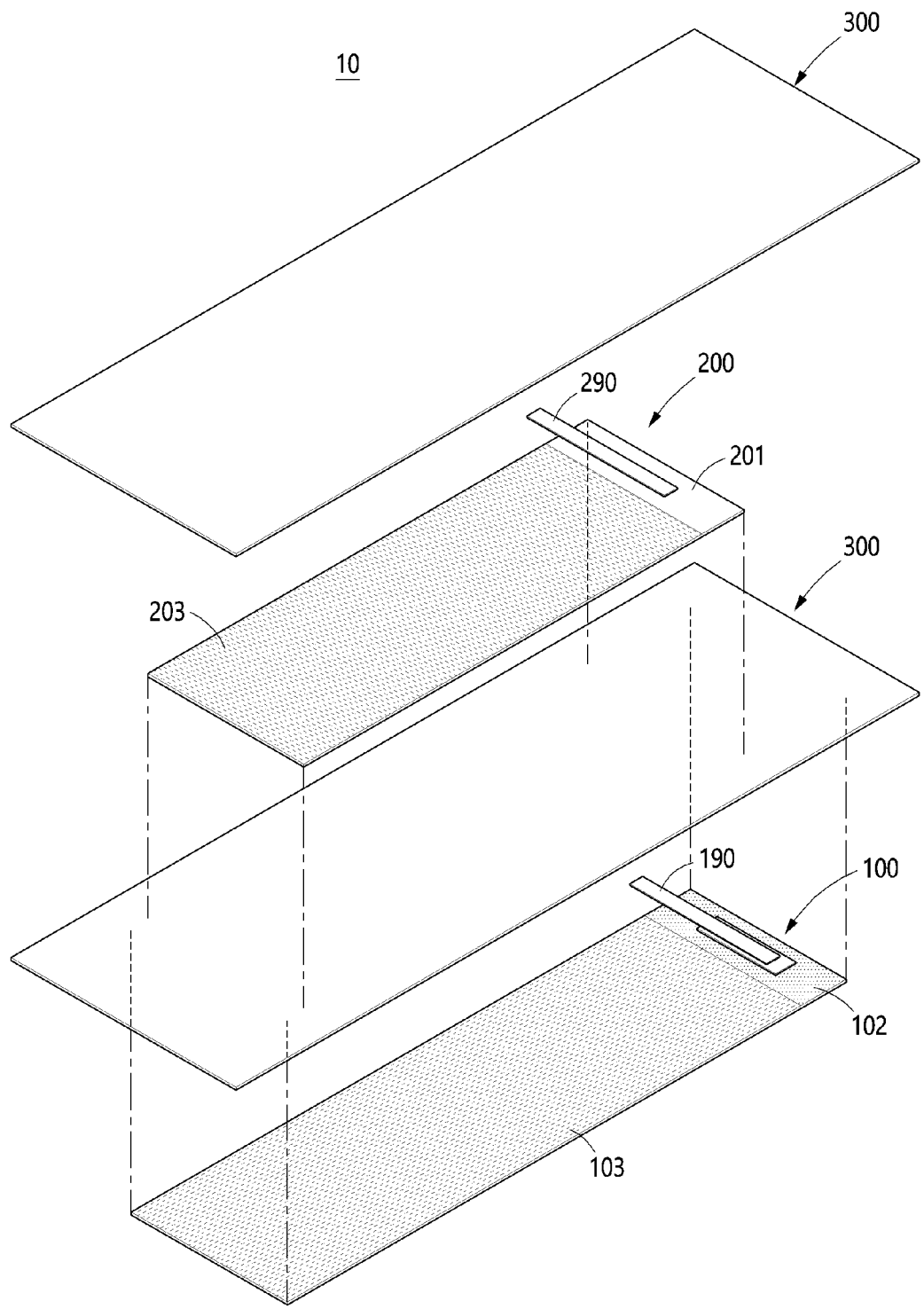
FIG. 2 is an exploded perspective view illustrating an electrode assembly according to the present invention.
Figure 3:
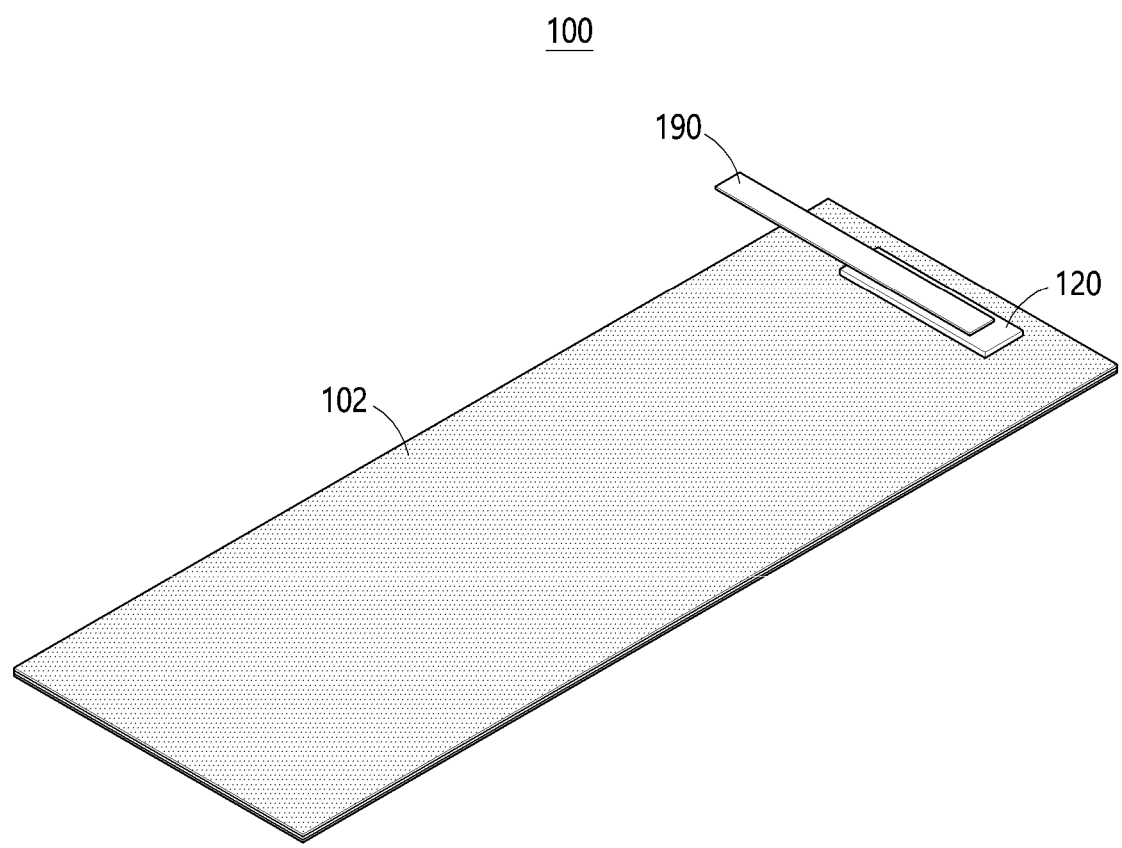
FIG. 3 is a perspective view illustrating the current collector for a positive electrode according to the present invention.
Figure 4:
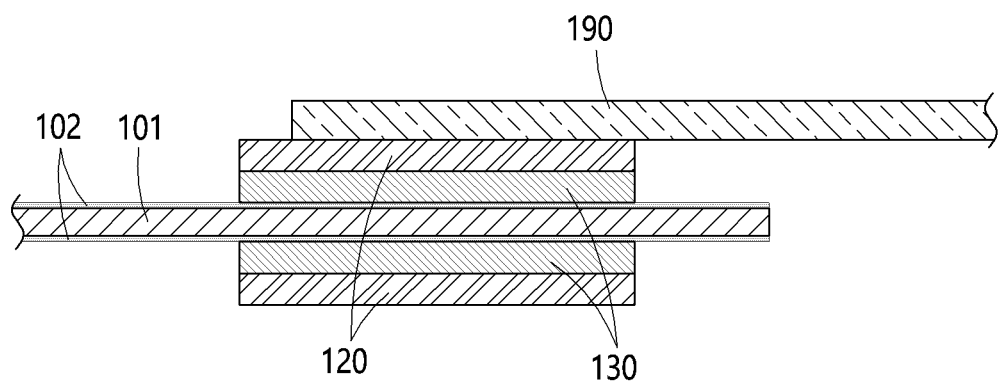
FIG. 4 is a cross-sectional view illustrating a current collector for a positive electrode according to a first embodiment of the present invention.
Figure 5:
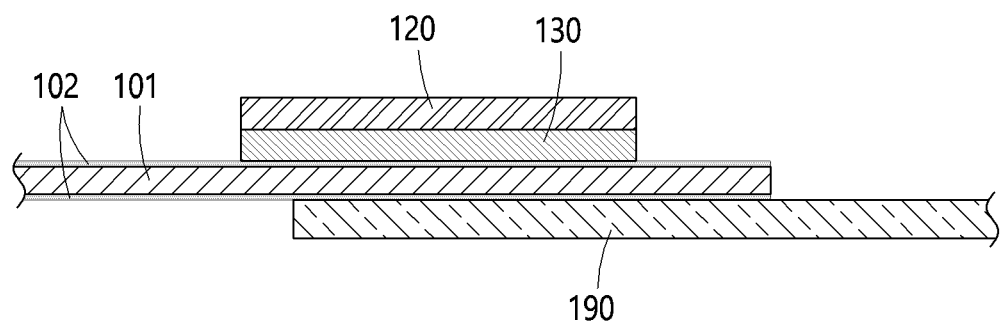
FIG. 5 is a cross-sectional view illustrating a current collector for a positive electrode according to a second embodiment of the present invention.
Figure 6:
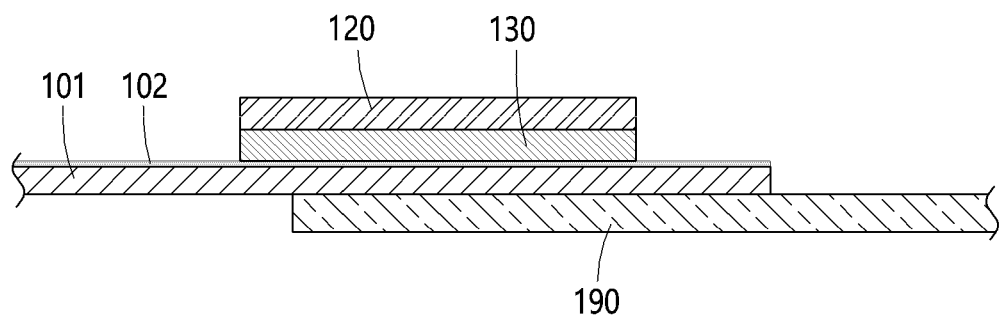
FIG. 6 is a cross-sectional view illustrating a current collector for a positive electrode according to a third embodiment of the present invention.
Figure 7:
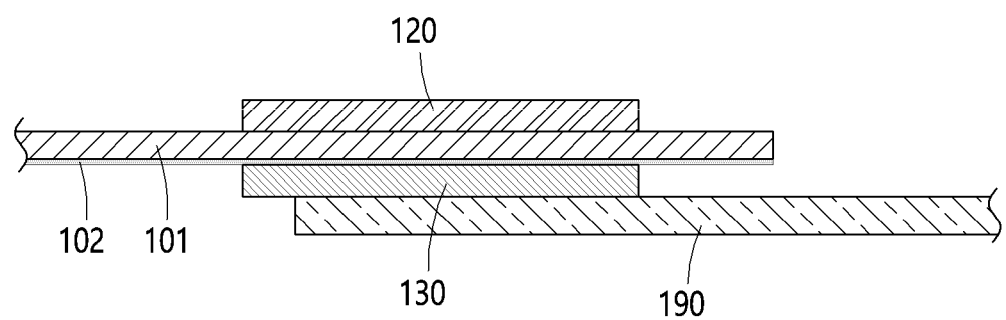
FIG. 7 is a cross-sectional view illustrating a current collector for a positive electrode according to a fourth embodiment of the present invention.
Figure 8A:
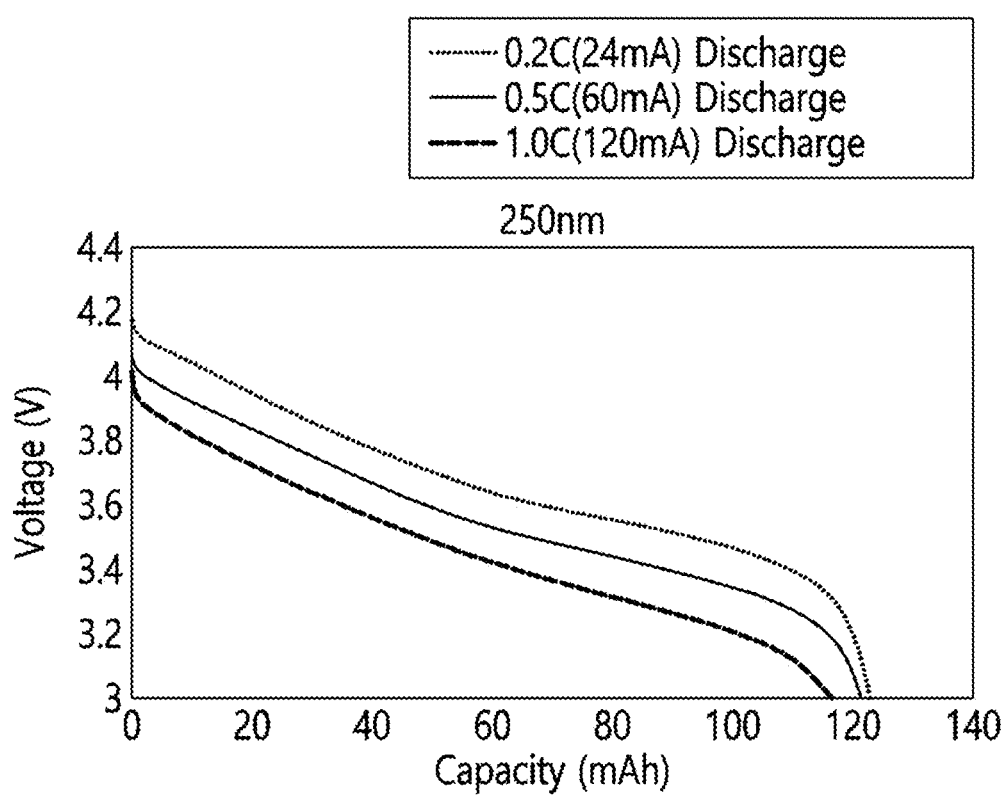
FIGS. 8A to 8C are graphs showing results of measuring capacities with respect to thicknesses of a conductive material in the lithium secondary battery including the current collector for a positive electrode according to the first embodiment of the present invention.
Figure 8B:
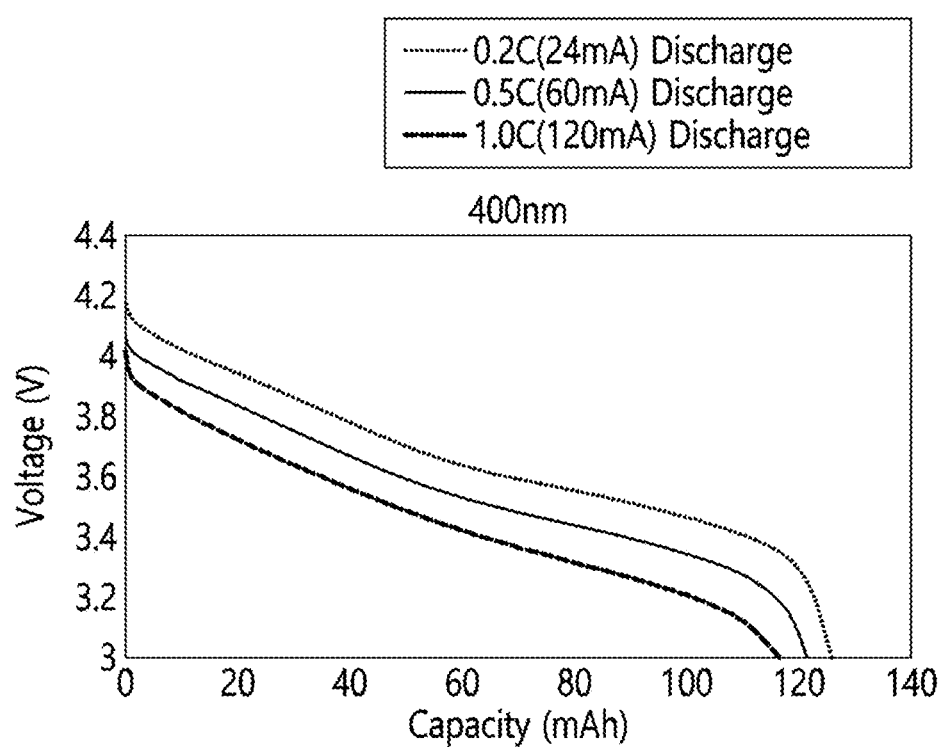
Figure 8C:
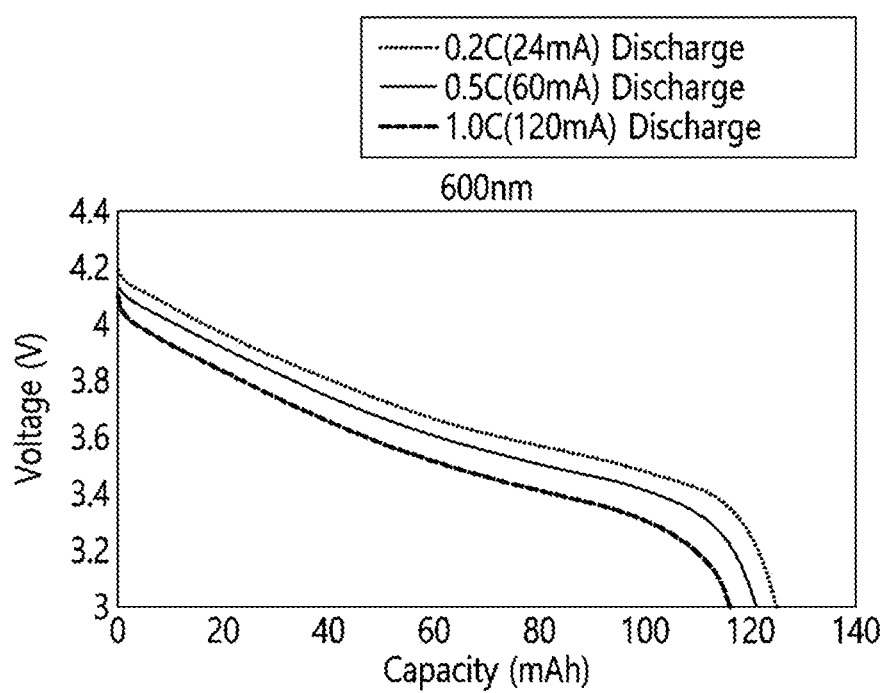

FIG. 1 is a perspective view illustrating an electrode assembly including a current collector for a positive electrode according to the present invention, FIG. 2 is an exploded perspective view illustrating an electrode assembly according to the present invention, FIG. 3 is a perspective view illustrating the current collector for a positive electrode according to the present invention, FIG. 4 is a cross-sectional view illustrating a current collector for a positive electrode according to a first embodiment of the present invention, FIG. 5 is a cross-sectional view illustrating a current collector for a positive electrode according to a second embodiment of the present invention, FIG. 6 is a cross-sectional view illustrating a current collector for a positive electrode according to a third embodiment of the present invention, FIG. 7 is a cross-sectional view illustrating a current collector for a positive electrode according to a fourth embodiment of the present invention, FIGS. 8A to 8C are graphs showing results of measuring capacities with respect to thicknesses of a conductive material in the lithium secondary battery including the current collector for a positive electrode according to the first embodiment of the present invention, and FIGS. 9A to 9D are graphs showing results of nail penetration tests with respect to thicknesses of the conductive material in the lithium secondary battery including the current collector for a positive electrode according to the first embodiment of the present invention.

FIGS. 1 and 2 illustrate an electrode assembly 10 including a current collector 100 for a positive electrode (a cathode) according to the present invention. In the case of the current collector 100 for a positive electrode according to the present invention illustrated in FIGS. 1 and 2, a positive electrode active material 103 needs to be applied onto a surface of the current collector 100 for a positive electrode so that the current collector 100 for a positive electrode is used for the electrode assembly 10.

Meanwhile, a current collector 200 for a negative electrode (an anode) may have negative electrode metal foil 201 coated with a negative electrode active material 203, and a negative electrode lead tab 290 may be connected to one end of the current collector 200 for a negative electrode based on a longitudinal direction of the current collector 200 for a negative electrode.

A separator 300 may be disposed between the current collector 200 for a negative electrode and the current collector 100 for a positive electrode according to the present invention. In a state illustrated in FIG. 2, as the current collector 200 for a negative electrode and the current collector 100 for a positive electrode are sequentially stacked with the separator 300 interposed therebetween, the electrode assembly 10 illustrated in FIG. 1 is made.

FIG. 3 illustrates the current collector 100 for a positive electrode according to the present invention. The current collector 100 for a positive electrode does not use metal foil unlike the current collector 200 for a negative electrode described above.

The current collector 100 for a positive electrode according to the present invention illustrated in FIG. 3 has a resistance value larger than a resistance value of the current collector using the metal foil, such that the current collector for a positive electrode may adjust a limit current value of the current flowing in the current collector for a positive electrode. Because the flow of current may be hindered by damage to a polymer film, the current collector for a positive electrode may reduce short-circuit current or prevent heat generation in the event of an internal short circuit of the secondary battery.

The lithium secondary battery having the current collector 100 for a positive electrode according to the present invention may have properties or concept of a max current limited battery (MCLB). Hereinafter, the current collector for a positive electrode according to the present invention, which enables implementation of the MCLB, will be described.

Since the current collector 100 for a positive electrode according to the present invention has a resistance value larger than a resistance value of the current collector for a positive electrode of the battery in the related art using the metal foil, the current collector 100 for a positive electrode may adjust the limit current and reduce the short-circuit current and heat generation occurring in the event of a short circuit by destroying a current path in the event of the internal short circuit, thereby improving safety of the battery.

The current collector 100 for a positive electrode according to the present invention does not use the metal foil. The current collector 100 for a positive electrode according to the present invention may use a polymer film 101 as a basic material, and the polymer film 101 may be formed or coated with metal with a small thickness.

Hereinafter, various shapes of the current collector 100 for a positive electrode according to the present invention will be described with reference to the drawings.

First, referring to FIGS. 4 to 7, a current collector 100, 400, 500, or 600 for a positive electrode according to the present invention includes: the polymer film 101; a conductive material 102 provided on at least one of upper and lower surfaces of the polymer film 101; a metal piece (metal element) 120 provided on the upper or lower surface of the polymer film 101 and electrically connected to the conductive material 102; and a lead tab 190 joined to any one of the metal piece 120, the conductive material 102, and the polymer film 101 and electrically connected to the conductive material 102. The conductive material 102 may be positioned between the metal piece 120 and the polymer film 101 or positioned between the lead tab 190 and the polymer film 101. The lead tab 190 may be welded to the metal piece 120 provided on the upper or lower surface of the polymer film 101 or welded to the metal piece 120 provided on one surface of the polymer film 101 that faces the lead tab 190.

In this case, the conductive material 102 may be positioned between the metal piece 120 and the polymer film 101 or positioned between the polymer film 101 and the lead tab 190.

In this case, in the event of a short circuit, the conductive material 102 may serve as an electrochemical fuse through a reaction with an electrolyte, such that the conductive material 102 may have a function of preventing a short circuit. The electrochemical characteristics of the conductive material 102 will be described below.

The polymer film 101 may be provided in the form of a band having a predetermined length. In this case, the electrode assembly 10 to be described below may be formed as the polymer film 101 is supplied or transferred by a roll-to-roll method along a longitudinal direction thereof (i.e., a direction of a relatively long length).

The polymer film 101 may be made of a polymeric nonconductive material such as polyethylene (PE), polypropylene (PP), polybutylene terephthalate (PBT), polyimide (PI), or polyethylene terephthalate (PET).

The polymer film 101 may have a thickness of 50 µm or less, particularly, a thickness of 1.4 µm or more and 50 µm or less. The current collector 100 for a positive electrode according to the first embodiment of the present invention may reduce a thickness or weight of the battery in comparison with a case in which the current collector using the metal foil in the related art is used. The current collector 100 for a positive electrode uses, as the polymer film 101, a polymeric film having a thickness of 1.4 µm or more and 50 µm or less and made of a nonconductive material, which makes it possible to reduce an overall thickness or weight of the lithium secondary battery having the current collector 100, 400, 500, or 600 for a positive electrode according to the present invention.

Meanwhile, the polymer film 101 may be made of a material which is melted at a temperature lower than 300° C. The lead tab 190 is fixed to the polymer film 101 by welding. Unless the polymer film 101 is melted at a temperature lower than a welding temperature of the lead tab 190, the lead tab 190 cannot be coupled to the polymer film 101. Therefore, the polymer film 101 needs to have a melting point at which the polymer film 101 may be melted during the process of welding the lead tab 190. The polymer film 101 may have a melting point lower than 300° C.

Meanwhile, the current collector 100, 400, 500, or 600 for a positive electrode according to the present invention may include the conductive material 102 disposed on at least one of the upper and lower surfaces of the polymer film 101.

The conductive material 102 may be aluminum (Al), and the surface of the polymer film 101 may be plated or coated with the conductive material 102. Therefore, the conductive material 102 may be referred to as a conductive layer that defines an outermost surface of the current collector 100 for a positive electrode.

The conductive material 102 may be formed to adjust or reduce limit current or maximum current of the current collector 100, 400, 500, or 600 for a positive electrode. In other words, the conductive material 102 may be aluminum with which at least one of the upper and lower surfaces of the polymer film 101 is plated or coated to control conductivity of the current collector 100, 400, 500, or 600 for a positive electrode. When the description is focused on the state in which the surface of the polymer film 101 is plated or coated with the conductive material 102, the conductive material 102 may be referred to as the conductive layer. Hereinafter, it is noted that the conductive material 102 has the concept including the conductive layer.

It is possible to control or reduce the maximum amount of current flowing in the current collector 100, 400, 500, or 600 for a positive electrode by adjusting the amount of coating or a coating thickness of the conductive material 102 with which at least one of the upper and lower surfaces of the polymer film 101 is plated or coated. Therefore, it is possible to improve the safety of the lithium secondary battery and ensure safety of the battery in the event of a short circuit.

In other words, the limit current or the maximum current flowing in the current collector 100 for a positive electrode may be adjusted depending on the thickness or the amount of the conductive material 102 formed on the surface of the polymer film 101. As described above, the conductive material 102 of the current collector 100, 400, 500, or 600 for a positive electrode according to the present invention may implement properties or concept of the max current limited battery (MCLB) of the lithium secondary battery.

In addition, in the event of a physical internal short circuit or an external short circuit, the polymer film 101 may be melted and hinder rapid current generation, thereby improving safety of the battery. Further, when the conductive material 102 has a small thickness, electric potential of the aluminum layer constituting the conductive material 102 is reduced in the event of an internal short circuit or an external short circuit, which induces an electrochemical reaction between the aluminum layer and the electrolyte. Therefore, it possible to reduce the conductivity or block the current, thereby improving safety of the battery.

The conductive material 102 may be formed on the surface of the polymer film 101 in various ways. For example, when the conductive material 102 is metal, the conductive material 102 may be formed on the surface of the polymer film 101 by sputtering or evaporation coating.

It is possible to control the conductivity of the current collector 100 for a positive electrode or ensure safety of the battery depending on the amount (weight) or thickness of the conductive material 102 with which the surface of the polymer film is plated or coated. Therefore, it is necessary to use a method capable of controlling or adjusting the thickness or weight of the conductive material 102.

The thickness of the conductive material 102 with which the surface of the polymer film 101 is plated or coated may be determined depending on a length of the lead tab 190 and a length of the electrode (current collector). For example, when the length of the electrode (current collector) increases, a plating thickness of the conductive material 102 may also increase.

The conductive material 102 may be formed on only one surface of the polymer film 101 or both of the two opposite surfaces of the polymer film 101. In this case, the conductive material 102 may be formed with a minimum thickness of 0.25 μm and a maximum thickness of 0.6 μm on any one surface of the polymer film 101.

In the current collector 100, 400, 500, or 600 for a positive electrode according to the present invention, the flow of current may be implemented by the conductive material 102. Therefore, the state in which the surface of the polymer film 101 is plated or coated with the conductive material 102 needs to be properly maintained. To this end, the polymer film 101 may be subjected to surface treatment, thereby increasing a binding force between the conductive material 102 and the polymer film 101.

If the binding force between the conductive material 102 and the polymer film 101 is low, the conductive material 102 may be detached or separated from the surface of the polymer film 101 in a state in which the electrolyte is injected. Therefore, it is important to increase the binding force between the conductive material 102 and the polymer film 101.

The surface treatment may be performed on the surface of the polymer film 101 to increase a bonding force or binding force with the conductive material 102.

The surface of the polymer film 101 may be subjected to corona treatment to increase the binding force between the conductive material 102 and the polymer film 101.

Meanwhile, the current collector 100, 400, 500, or 600 for a positive electrode according to the present invention may have the lead tab 190 configured to be connected to the external device.

In the case of the electrode current collector using the metal foil in the related art, the lead tab may be welded directly to the metal foil. In contrast, in the case of the current collector 100, 400, 500, or 600 for a positive electrode according to the present invention, the thin polymer film 101 corresponds to the metal foil in the related art. For this reason, the lead tab cannot be welded directly to the polymer film 101. That is, the lead tab 190 needs to be welded to the conductive material 102 formed on the upper or lower surface of the polymer film 101. However, since the polymer film 101 is thin, sufficient tensile strength of a welded part cannot be ensured, which makes it difficult to attach the lead tab 190 to the polymer film 101. According to the current collector 100, 400, 500, or 600 for a positive electrode according to the present invention, the lead tab 190 is welded to the metal piece 120 made of a metallic material in the state in which the metal pieces 120 are attached to the upper and lower surfaces of the polymer film 101, or the lead tab 190 is welded to the metal piece 120 in the state in which the metal piece 120 is attached to one surface of the polymer film 101 and the lead tab 190 is attached to the other surface of the polymer film 101, which makes it possible to solve the above-mentioned problem.

According to the current collector 100, 400, 500, or 600 for a positive electrode according to the present invention, the lead tab 190 may be welded to the metal piece 120, the conductive material 102, or the polymer film 101 by ultrasonic welding, laser welding, or spot welding.

According to the current collectors 100, 400, 500, and 600 for a positive electrode according to the present invention illustrated in FIGS. 4 to 7, the metal piece 120 and the lead tab 190, which are made of metal, may be positioned on the upper and lower surfaces of the polymer film 101, respectively.

Hereinafter, the current collectors 100, 400, 500, and 600 for a positive electrode will be described in more detail with reference to FIGS. 4 to 7.

First, in the current collector 100 for a positive electrode according to the first embodiment of the present invention illustrated in FIG. 4, the conductive materials 102 may be provided on the upper and lower surfaces of the polymer film 101. The metal pieces 120 are respectively provided on the upper and lower surfaces of the polymer film 101 and respectively joined or connected to the upper and lower conductive materials 102. That is, the metal pieces 120 may be respectively joined or connected to the conductive materials 102 on the upper and lower surfaces of the polymer film 101. The lead tab 190 is welded to any one of the metal pieces 120 provided on the upper and lower surfaces of the polymer film 101, such that the lead tab 190 may be electrically connected to the metal piece 120 and the conductive material 102.

In this case, the metal piece 120 may serve to ensure a position on the polymer film 101 at which the lead tab 190 is welded. That is, the metal piece 120 may serve as a connection part of the lead tab 190.

The metal piece 120 may have a thickness of 5 μm or more. In this case, it is enough that the metal piece 120 is provided on only a part of the polymer film 101. The number of metal pieces 120 or the position of the metal piece 120 provided on the polymer film 101 is not limited. However, in the case in which the lead tab 190 is welded to the metal piece 120, the position on the metal piece 120 at which the lead tab 190 is welded may be determined in consideration of the shape of the electrode assembly.

As described above, the metal piece 120 may be provided in the form of a thin metal film or metal foil having a thickness of 5 μm or more, but the shape of the metal piece 120 is not necessarily limited thereto. That is, the metal piece 120 may be provided in the form of a thin film, foil, or a mesh.

The metal piece 120 may be configured as aluminum foil or SUS 316L foil.

As described above, the metal piece 120 of the current collector 100 for a positive electrode according to the first embodiment of the present invention may ensure the welding position of the lead tab 190.

As illustrated in FIG. 4, the conductive materials 102 may be respectively formed on the two opposite upper and lower surfaces of the polymer film 101, and the metal pieces 120 may be respectively provided on the two opposite upper and lower surfaces of the polymer film 101 and in contact with the upper and lower conductive materials 102. The lead tab 190 may be welded to any one of the upper and lower metal pieces 120. When the welding is performed, the polymer film 101 may be melted, such that the conductive material 102, the metal piece 120, and the lead tab 190 may be electrically connected.

In addition, referring to the current collector 100 for a positive electrode according to the first embodiment of the present invention illustrated in FIG. 4, insulating polymeric layers 130 may each be provided between the conductive material 102 and one surface of the metal piece 120 that faces the conductive material 102. The insulating polymeric layer 130 serves to attach the metal piece 120 to the surface of the polymer film 101 or the surface of the conductive material 102 or insulate the conductive material 102 and the metal piece 120. Referring to FIG. 4, the insulating polymeric layer 130 may be provided between the conductive material 102 and the metal piece 120.

The insulating polymeric layer 130 may be made of a material having bondability or adhesiveness. In addition, the insulating polymeric layer 130 may be made of a polymeric material or provided in the form of a polymeric film. In the case in which the insulating polymeric layer 130 is provided in the form of a polymeric film, the insulating polymeric layer 130 may have a thickness smaller than 50 μm.

The insulating polymeric layer 130 may be melted at the same temperature as the polymer film 101 or melted at a lower temperature than the polymer film 101. That is, the insulating polymeric layer 130 may have the same melting point as the polymer film 101 or a melting point lower in temperature than a melting point of the polymer film 101.

The insulating polymeric layer 130 may not only be made of a polymeric material such as polyethylene (PE), polypropylene (PP), polyvinylidene difluoride (PVDF), polyethylene terephthalate (PET), or polyimide (PI), but also be made of a polymeric material such as ethylene vinyl acetate (EVA) or acrylate-based compound having adhesive components.

The insulating polymeric layer 130 may not only serve to attach the metal piece 120 to the surface of the polymer film 101 or the conductive material 102 but also serve as an insulating layer. The insulating polymeric layer 130 is electrically connected to the conductive material 102 while being melted at the time of welding the lead tab 190, and a part of the lead tab 190, except for the welded part, is insulated by the insulating polymeric layer 130. In the case in which the electrically connected part is limited to the welded part, the conductive material 102 corresponding to the welded part reacts to reduce or block current in the event of an external short circuit. If the electrically connected part is large, a large amount of reaction is required, which makes it difficult to block the current. Therefore, in the case in which the metal piece 120 is attached to the conductive material 102, the insulating polymeric layer 130 having insulation may be provided between the conductive material 102 and the metal piece 120.

In this case, the insulating polymeric layers 130 and the metal pieces 120 respectively attached to the conductive materials 102 respectively provided on the two opposite surfaces of the polymer film 101 may be provided at the same position based on the polymer film 101.

FIG. 5 illustrates the current collector 400 for a positive electrode according to the second embodiment of the present invention. Referring to FIG. 5, the current collector 400 for a positive electrode may include conductive materials 102 applied onto two opposite upper and lower surfaces of a polymer film 101, a metal piece 120 provided on a surface of one of the conductive materials 102, a lead tab 190 provided on a surface of the other of the conductive materials 102, an insulating polymeric layer 130 provided between the conductive material 102 and the metal piece 120, and an insulating polymeric layer 130 provided between the conductive material 102 and the lead tab 190.

In comparison with the current collector 100 for a positive electrode illustrated in FIG. 4, there is a difference in that the metal piece 120 is provided at one side of the polymer film 101, the lead tab 190 is provided at the other side of the polymer film 101, and the insulating polymeric layer 130 is provided between the metal piece 120 and the conductive material 102, but no metal piece 120 is provided between the insulating polymeric layer 130 and the lead tab 190. However, the current collector 400 for a positive electrode illustrated in FIG. 5 is similar to the current collector 100 for a positive electrode illustrated in FIG. 4 in that the members made of metal, i.e., the metal piece 120 and the lead tab 190 are respectively positioned on both the upper and lower surfaces of the polymer film 101.

The metal piece 120 and the lead tab 190 respectively provided on the two opposite upper and lower surfaces of the polymer film 101 may be provided at the same position.

FIG. 6 illustrates the current collector 500 for a positive electrode according to the third embodiment of the present invention. Referring to FIG. 6, the current collector 500 for a positive electrode may include a conductive material 102 applied only onto any one of two opposite upper and lower surfaces of a polymer film 101, a metal piece 120 provided on a surface of the conductive material 102, a lead tab 190 provided on a surface of the polymer film 101 on which no conductive material 102 is provided, and an insulating polymeric layer 130 provided between the conductive material 102 and the metal piece 120.

In comparison with the current collector 400 for a positive electrode illustrated in FIG. 5, there is a difference in that the conductive material 102 and the metal piece 120 are provided only on one surface of the polymer film 101, only the lead tab 190 is provided on the other surface of the polymer film 101, and the insulating polymeric layer 130 is provided between the metal piece 120 and the conductive material 102, but no insulating polymeric layer 130 is provided between the polymer film 101 and the lead tab 190. However, the current collector 500 for a positive electrode illustrated in FIG. 6 is similar to the current collector 100 for a positive electrode illustrated in FIG. 4 and the current collector 400 for a positive electrode illustrated in FIG. 4 in that the members made of metal, i.e., the metal piece 120 and the lead tab 190 are respectively positioned on both the upper and lower surfaces of the polymer film 101.

The metal piece 120 and the lead tab 190 respectively provided on the two opposite upper and lower surfaces of the polymer film 101 may be provided at the same position.

In the current collector 500 for a positive electrode according to the third embodiment of the present invention illustrated in FIG. 6, the lead tab 190 is attached to one surface of the polymer film 101 onto which no aluminum conductive material 102 is applied. Therefore, the lead tab 190 does not meet the separator and the negative electrode at the time of forming the electrode assembly by folding inward the surface on which no conductive material 102 is provided. Therefore, there is an advantage in that no separate protective film is required to prevent a short circuit of the lead tab 190.

FIG. 7 illustrates the current collector 600 for a positive electrode according to the fourth embodiment of the present invention. Referring to FIG. 7, the current collector 600 for a positive electrode may include a conductive material 102 applied only onto any one of the two opposite upper and lower surfaces of the polymer film 101, a lead tab 190 provided on a surface of the conductive material 102, a metal piece 120 provided on a surface of the polymer film 101 on which no conductive material 102 is provided, and an insulating polymeric layer 130 provided between the conductive material 102 and the lead tab 190.

The metal piece 120 and the lead tab 190 respectively provided on the two opposite upper and lower surfaces of the polymer film 101 may be provided at the same position.

The current collector 600 for a positive electrode illustrated in FIG. 7 differs from the current collector 400 for a positive electrode illustrated in FIG. 6 in that the positions of the metal piece 120 and the lead tab 190 are reversed. However, the current collector 600 for a positive electrode illustrated in FIG. 7 is similar to the current collector 100 for a positive electrode illustrated in FIG. 4, the current collector 400 for a positive electrode illustrated in FIG. 4, and the current collector 500 for a positive electrode illustrated in FIG. 6 in that the members made of metal, i.e., the metal piece 120 and the lead tab 190 are respectively positioned on both the upper and lower surfaces of the polymer film 101. Therefore, it can be seen that the current collector 600 for a positive electrode according to the fourth embodiment of the present invention illustrated in FIG. 7 may also ensure sufficient tensile strength of the welded part of the lead tab 190 and have excellent electrical conductivity.

According to the current collector 100, 400, 500, or 600 for a positive electrode according to the present invention, tensile strength of the welded part of the polymer film 101 or the lead tab 190 is good even in the case in which the insulating polymeric layer 130 made of a polymer is provided on at least one of the upper or lower surface of the polymer film 101 because the member made of metal, i.e., the metal piece 120 or the lead tab 190 is positioned on each of the two opposite surfaces of the polymer film 101.

When the lead tab 190 is welded, the lead tab 190 is joined as the insulating polymeric layer 130 and the polymer film 101 are melted at the welded part, such that the lead tab 190 may be electrically connected to the conductive material 102.

Meanwhile, referring to FIG. 3, the metal piece 120 is positioned on the conductive material 102, and the lead tab 190 is positioned on the metal piece 120. In this case, the insulating polymeric layer 130 is present between the metal piece 120 and the conductive material 102. During the process of welding the lead tab 190, a welded point is formed as the insulating polymeric layer 130 and the polymer film 101 are melted. As illustrated in FIG. 3, the lead tab 190 is welded as the insulating polymeric layer 130 positioned between the metal piece 120 and the conductive material 102 is melted. The electrical connection is implemented only by the welded point connected as the insulating polymeric layer 130 is melted. In the case in which the insulating polymeric layer 130 is present as described above, the electrical connection forms a current path at a very small portion only on the welded point at the time of welding the lead tab 190. As a result, it is possible to insulate a portion between the lead tab 190 and the conductive material 102 or between the metal piece 120 and the conductive material 102. In addition, the remaining part, except for the welded point, is exposed to the electrolyte or is in a state in which the electrolyte easily permeates into the remaining part.

If no insulating polymeric layer is provided between the lead tab or metal piece and the conductive material, the conductive material is in direct contact with the lead tab or the metal piece. In this case, the lead tab or the metal piece is in physical contact with the conductive material in an area corresponding to a size of the lead tab or the metal piece. In the case of the current collector for a positive electrode in which the lead tab or the metal piece is in physical contact with the conductive material on the welded part of the lead tab as described above, no insulating polymeric layer is provided between the metal piece and the conductive material. Therefore, a surface contact corresponding to an area of the metal piece is provided, and a reaction area is inevitably large. For this reason, it is difficult to allow all the conductive materials applied onto the surface of the polymer film to react. When an external short circuit occurs on the battery using the current collector for a positive electrode, the current path is maintained, which may cause an increase in temperature of the battery without blocking current.

In the case in which the lead tab 190 is welded to any one of the metal pieces 120 provided on the two opposite surfaces of the polymer film 101, the metal pieces 120 provided on the two opposite surfaces of the polymer film 101 may be connected to each other as the polymer film 101 is melted. As a result, the lead tab 190 may be electrically connected simultaneously to the conductive materials 102 provided on the two opposite surfaces of the polymer film 101.

A part of the polymer film 101 may be melted when the lead tab 190 is coupled to the metal piece 120 provided on any one surface of the polymer film 101 by ultrasonic welding, laser welding, or spot welding in the state in which the metal pieces 120 and the conductive materials 102 are provided on the two opposite upper and lower surfaces of the polymer film 101. When the temperature of welding heat generated at the time of welding the lead tab 190 is higher than a melting point of the polymer film 101, the polymer film 101 may be melted during the welding process.

Because no polymer film 101 is present at a portion where the polymer film 101 is melted, the upper and lower metal pieces 120 may come into direct contact with each other. In this case, because the metal pieces 120 are also melted by the welding heat, the upper and lower metal pieces 120 are joined to each other. Therefore, because the upper and lower metal pieces 120 are coupled directly to each other at the portion where the polymer film 101 is melted and removed, the lead tab 190 welded to any one metal piece 120 may be electrically connected not only to the upper and lower metal pieces 120, but also to the conductive materials 102 formed on the upper and lower surfaces of the polymer film 101.

According to the current collector 100, 400, 500, or 600 for a positive electrode according to the present invention, the state in which the metal piece 120 is connected to the polymer film 101 is maintained even though a part of the polymer film 101 is melted by welding heat. Therefore, it is possible to connect the lead tab 190.

However, in some instances, the lead tab 190 may be welded to the metal piece 120 even in the state in which the polymer film 101 is not melted.

Meanwhile, the current collector 100, 400, 500, or 600 for a positive electrode according to the present invention is a current collector used as the positive electrode of the lithium secondary battery and may improve safety of the lithium secondary battery unlike the current collector having the metal foil in the related art. This is because the conductive material 102 formed or applied onto the polymer film 101 serves to block short-circuit current or reduce short-circuit current like a fuse.

In general, when an internal short circuit or an external short circuit occurs on the secondary battery, heat is generated as a temperature of the secondary battery is increased by the short-circuit current, which causes a risk that the generated heat causes explosion of the battery. In contrast, even though an internal short circuit or an external short circuit occurs on the lithium secondary battery that uses the current collector 100, 400, 500, or 600 for a positive electrode according to the present invention as the positive electrode, it is possible to prevent the temperature of the lithium secondary battery from increasing and ensure safety of the lithium secondary battery by blocking the short-circuit current or reduce the short-circuit current.

When a short circuit occurs on the lithium secondary battery that uses the current collector 100, 400, 500, or 600 for a positive electrode according to the present invention as the positive electrode, electric potential of the current collector 100, 400, 500, or 600 for a positive electrode having the polymer film 101 formed or coated with aluminum metal as the conductive material 102 decreases approximately to negative electrode electric potential (i.e., <0.3 volt, negative electrode Li metal), and the aluminum conductive material 102 reacts with the electrolyte. Therefore, the conductive material 102 is broken as if the conductive material 102 is corroded, thereby blocking the short-circuit current or reducing the short-circuit current.

The conductive material 102 formed or applied onto the polymer film 101 serves as a current path. When the conductive material 102 is broken into fine pieces while reacting with the electrolyte in the event of a short circuit, the current path is blocked, such that the short-circuit current does not flow any further or the short-circuit current is reduced.

The current collector 100, 400, 500, or 600 for a positive electrode according to the present invention may block the circuit current path or reduce the short-circuit current in the event of a short. This is because the thickness of the aluminum conductive material 102 formed on the surface of the polymer film 101 is very small, such that the conductive material 102 reacts with the electrolyte and is corroded and broken in the entire depth or thickness direction of the conductive material 102, thereby blocking the short-circuit current path or reducing the short-circuit current.

The inventors of the present invention measured resistance of the lead tab, measured battery capacities, and performed nail penetration tests with respect to the thicknesses of the conductive material 102 of the lithium secondary battery including the current collector 100, 400, 500, or 600 for a positive electrode according to the present invention. As a result, the inventors could find an optimum thickness range of the conductive material 102 that may ensure safety of the lithium secondary battery. Hereinafter, the test results and the optimum thickness range of the conductive material 102 will be described.

First, the current collector 100 for a positive electrode according to the first embodiment of the present invention illustrated in FIG. 4 is manufactured to perform the above-mentioned tests. Referring to FIG. 4, the current collector 100 for a positive electrode may include the conductive material 102 formed or applied onto at least one of the two opposite upper and lower surfaces of the polymer film 101, the insulating polymeric layer 130 provided between the metal piece 120 and the conductive material 102 and configured to attach the metal piece 120 to the conductive material 102, and the lead tab 190 welded to any one metal piece 120.

In this case, the polymer film 101 is made of polyethylene terephthalate (PET) with a thickness of 7 μm. The conductive material 102 with a thickness of 0.12 μm, 0.25 μm, 0.4 μm, or 0.6 μm may be provided on one surface of the polymer film 101 by sputtering. In addition, the insulating polymeric layer 130 is configured by an acrylic-based bonding agent with a thickness of 10 The metal piece 120 is configured by aluminum foil with a thickness of 12 μm. The metal pieces 120 are provided on the two opposite surfaces of the polymer film 101 and disposed at an angle of 90 degrees with respect to each other. In addition, the lead tab 190 is made of aluminum metal with a thickness of 100 μm and a width of 3 mm and welded, by ultrasonic welding, to the metal piece 120 on which the conductive material 102 is formed.

Measurement of resistance between lead tab and surface plated with conductive material Table 1 shows a result of measuring resistance between the lead tab 190 and the surface plated with the conductive material 102 with respect to the thicknesses of the conductive material 102. The resistance was measured by using an HIOKI 3554 measuring instrument.

TABLE 1

| Thickness of conductive material | Resistance (mOhm) |
|---|---|
| 0.12 μm | 758 |
| 0.25 μm | 344 |
| 0.4 μm | 260 |
| 0.6 μm | 150 |

Referring to Table 1, it can be ascertained that the resistance between the lead tab 190 and the surface plated with the conductive material 102 increases as the thickness of the conductive material 102 decreases, i.e., the amount of plating of the conductive material 102 decreases.

Measurement of capacities of lithium secondary battery with respect to thicknesses of conductive material To measure the capacities of the lithium secondary battery with respect to the thicknesses of the conductive material 102, the lithium secondary battery having the following characteristics was manufactured.

(1) Composition of positive electrode: NCM (L&F NE-X6S)/super-P/PVDF (solef 5130)=92/4/4
(2) Composition of negative electrode: graphite (BTR 518)/SBR (Zeon BM-400B)/CMC (Nippon paper)=97/1.5/1.5
(3) Positive electrode loading: 3 mAh/cm$^2$
(4) Current collector for a negative electrode: Cu foil (8 μm)
(5) Negative electrode loading: 3.1 mAh/cm$^2$
(6) Separator: 7 μm PE (Tonen)
(7) Electrolyte: EC/EMC 1M LiFP6, additional of additive Manufacture pouch type lithium secondary battery (DNP 113 μm) by winding positive electrode, separator, and negative electrode.

(8) Positive electrode size: 3 cm×15 cm
(9) Battery capacity: to 120 mAh

Table 2 shows the results of measuring the battery capacities of the lithium secondary battery having the above-mentioned characteristics with respect to the thicknesses of the conductive material 102.

TABLE 2

| Thickness of conductive material | 0.2 C (mAh) | 0.5 C (mAh) | 1.0 C (mAh) | Remarks |
|---|---|---|---|---|
| 0.12 μm | — | — | — | Battery does not operate |
| 0.25 μm | 122.7 (100%) | 119.0 (97.0%) | 110.4 (90.0%) | |
| 0.4 μm | 125.6 (100%) | 121.4 (96.7%) | 116.5 (92.8%) | |
| 0.6 μm | 124.6 (100%) | 120.6 (96.8%) | 116.1 (93.2%) | |

In Table 2, % in parenthesis means a ratio of 0.2 C capacity for each thickness of the conductive material 102. Referring to Table 2, it can be seen that the 1.0 C capacity decreases as the amount of plating of the conductive material 101 decreases, i.e., the thickness of the conductive material 102 decreases. However, the battery operated normally.

However, the battery did not operate when the thickness of the conductive material 102 was 0.12 μm. Therefore, it can be seen that the thickness of the conductive material 102 needs to be 0.25 μm or more to operate the battery.

FIGS. 8A to 8C are graphs showing results of measuring capacities with respect to thicknesses of a conductive material in the lithium secondary battery including the current collector for a positive electrode according to the first embodiment of the present invention. That is, FIGS. 8A to 8C are graphs showing the results of measuring the capacities when the thickness of the conductive material is 0.25 μm (see FIG. 8A), 0.4 μm (see FIG. 8B), and 0.6 μm (see FIG. 8C) in the contents shown in Table 2. Referring to FIGS. 8A to 8C, it can be seen that the lithium secondary battery exhibits the normal function of the battery in all the cases in which the thickness of the conductive material 102 of the current collector 100 for a positive electrode is 0.25 μm, 0.4 μm, and 0.6 μm.

Safety test of lithium secondary battery with respect to thicknesses of conductive material: Nail penetration test To test safety of the lithium secondary battery with respect to the thicknesses of the conductive material, the nail penetration test of penetrating the central portion of the battery at a speed of 150 mm/sec by using a SUS nail with a diameter of 3 mm was performed after fully charging the lithium secondary battery with 4.2V. Table 3 shows the result of the nail penetration test.

TABLE 3

| Thickness of conductive material | Maximum temperature (° C.) | Remarks |
|---|---|---|
| 0.25 μm | 28 | Slow voltage drop (>3.7 V @ 30 min) |
| 0.4 μm | 29 | Slow voltage drop (>3.7 V @ 30 min) |
| 0.6 μm | 28 | Slow voltage drop (>3.7 V @ 30 min) |
| Reference (12 μm Al foil) | −90 | Drop to about 0 V within 1 to 2 minutes |

Referring to Table 3, it can be ascertained that when the conductive material 102 is applied with a thickness of 0.25 μm to 0.6 the safety of the battery may be ensured and the battery operates normally even in the event of an external short circuit.

Figure 9A:
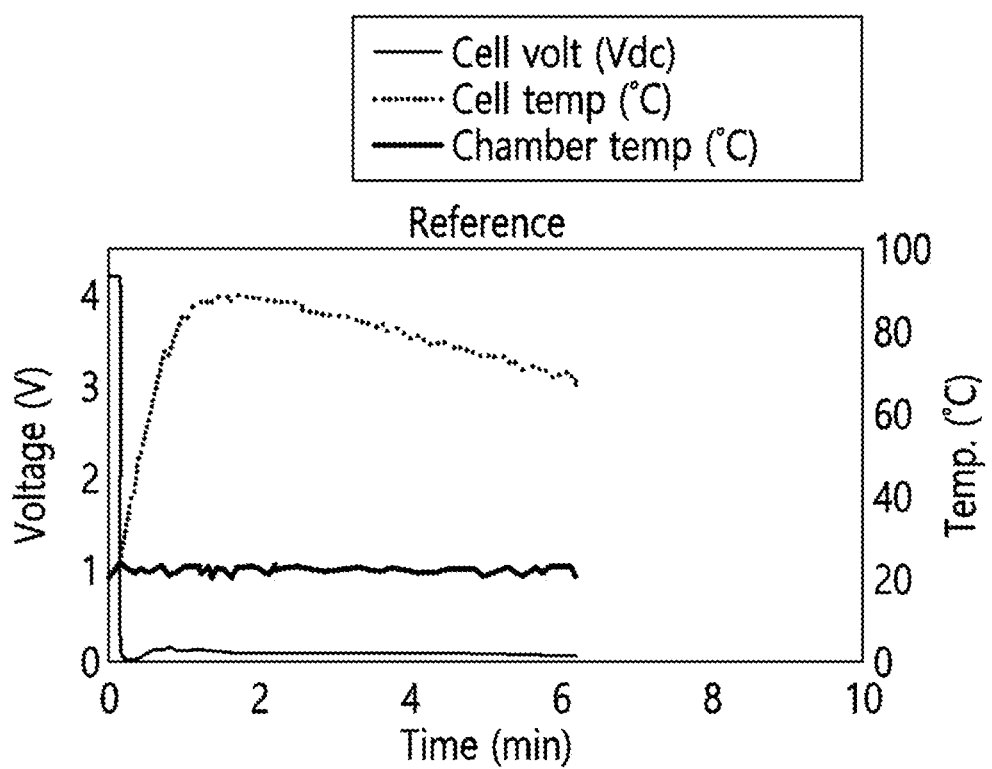
FIGS. 9A to 9D are graphs showing results of nail penetration tests with respect to thicknesses of the conductive material in the lithium secondary battery including the current collector for a positive electrode according to the first embodiment of the present invention.
Figure 9B:
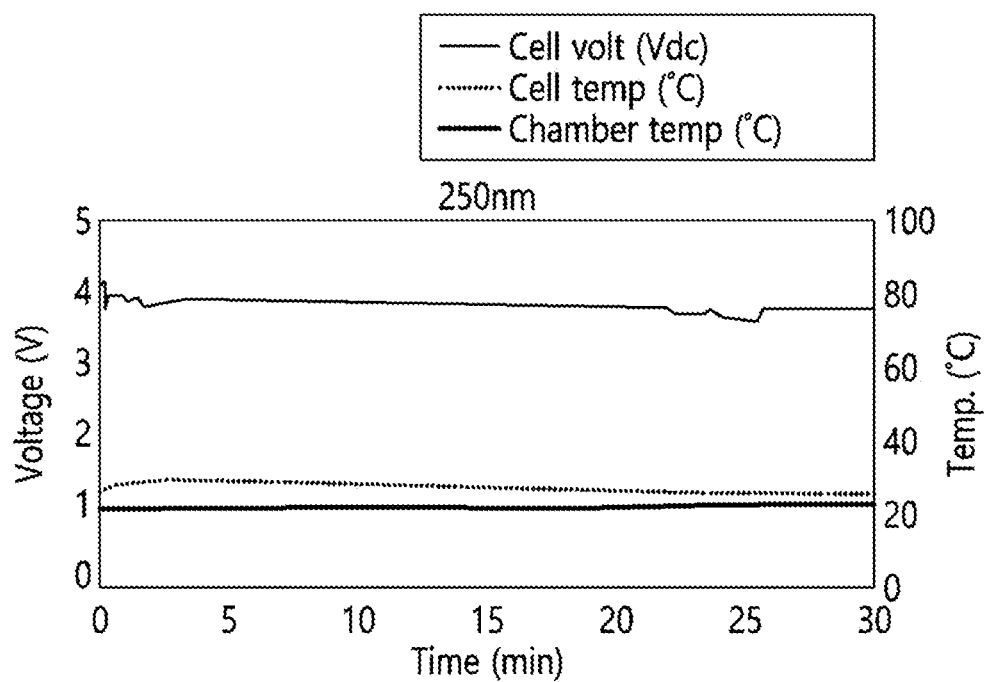
Figure 9C:
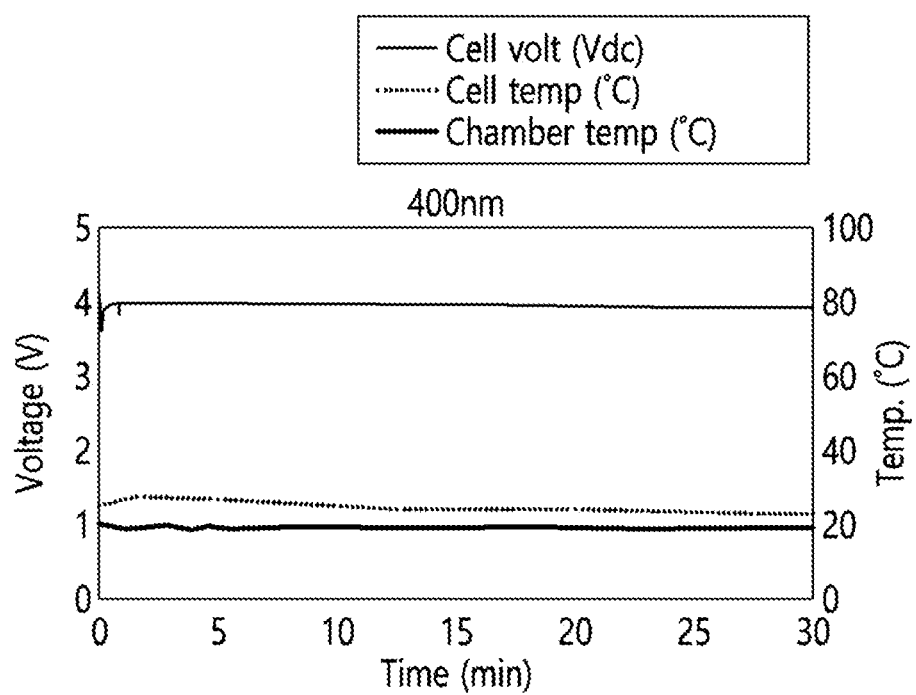
Figure 9D:
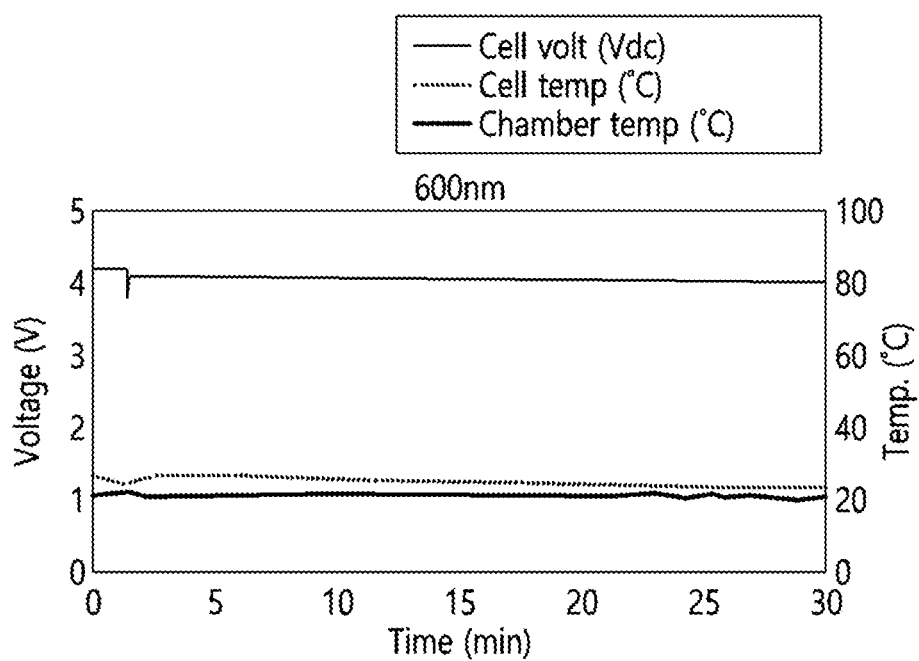

FIGS. 9A to 9D are graphs showing results of nail penetration tests with respect to thicknesses of the conductive material in the lithium secondary battery including the current collector for a positive electrode according to the first embodiment of the present invention. That is, FIGS. 9A to 9D are graphs showing changes in temperatures and voltages of the battery when the nail penetration tests are performed on the lithium secondary battery including the current collector for a positive electrode having the conductive material with the thickness of 0.25 (see FIG. 9B), 0.4 μm (see FIG. 9C), and 0.6 μm (see FIG. 9D) in the contents shown in Table 3 and a graph showing a change in temperature and voltage of the battery when the nail penetration test is performed on the lithium secondary battery including the current collector for a positive electrode having the metal foil in the related art (see FIG. 9A). Referring to FIG. 9A, it can be seen that when the battery using the metal foil current collector is penetrated by a nail, the temperature of the battery rapidly increases, and the voltage rapidly decreases. In this case, the safety of the battery extremely deteriorates. In contrast, as illustrated in FIGS. 9A to 9C, it can be seen that the temperature and voltage slowly decrease even though the battery using the conductive material 102 applied with the thickness of 0.25 μm, 0.4 μm, and 0.6 μm is penetrated by a nail. Therefore, since the temperature and voltage of the battery slowly decrease even though the lithium secondary battery using the current collector for a positive electrode according to the present invention is penetrated by the nail. Therefore, it is possible to improve the safety of the battery.

Meanwhile, according to the current collector 100, 400, 500, or 600 for a positive electrode according to the present invention, the aluminum conductive material 102 is formed or applied onto the surface of the polymer film 101 by sputtering or evaporation. The aluminum conductive material 102 formed by the above-mentioned method may have a plurality of nano-sized pores or irregular shapes such as cracks (hereinafter, referred to as "pore") formed in the surface thereof. This is because the aluminum conductive material 102 is not formed on the polymer film 101 by sputtering or deposition in a state in which fine aluminum particles are in close contact with one another by 100% without a gap. Fine gaps are present between the aluminum particles, and the fine gaps become the pores. In contrast, the current collector for a positive electrode having the metal foil in the related art does not have pores because the metal foil is rolled foil.

In this case, in the case of the current collector 100, 400, 500, or 600 for a positive electrode according to the present invention, the electrolyte permeates into the plurality of pores present in the aluminum conductive material 102. The electrolyte may be present in the pores over the entirety or a part of the thickness of the conductive material 102. When a short circuit occurs in this state, an area in which the conductive material 102 reacts with the electrolyte present in the pores of the conductive material 120 increases, such that the conductive material 102 may be easily corroded or broken in the thickness direction thereof, and as a result, the short-circuit current cannot flow. As described above, the plurality of pores existing in the conductive material 102 serves as a fuse that may block the flow of the short-circuit current or reduce the short-circuit current in the event of a short circuit.

As described above, according to the current collector 100, 400, 500, or 600 for a positive electrode according to the present invention, the conductive material 102 is formed on the surface of the polymer film 101 and has a thickness of 0.25 μm based on a minimum cross-section and a thickness of 0.6 μm based on a maximum cross-section. Therefore, it is possible to increase the energy density and improve the safety of the lithium secondary battery using the electrode current collector 100, 400, 500, or 600 as the positive electrode. Further, it is possible to ensure the safety of the lithium secondary battery in the event of a short circuit battery.

While the present invention has been described above with reference to particular contents such as specific constituent elements, the limited embodiments, and the drawings, but the embodiments are provided merely for the purpose of helping understand the present invention overall, and the present invention is not limited to the embodiment, and may be variously modified and altered from the disclosure by those skilled in the art to which the present invention pertains. Accordingly, the spirit of the present invention should not be limited to the described embodiment, and all of the equivalents or equivalent modifications of the claims as well as the appended claims belong to the scope of the spirit of the present invention.

The invention claimed is:

1. A current collector for a positive electrode, the current collector comprising:
a polymer film composed of a nonmetal or a nonconductor material;
an aluminum conductive material configured to define an outermost surface of the current collector for the positive electrode by being formed or applied, with a thickness of 0.25 to 0.6 μm, onto at least one of upper and lower surfaces of the polymer film; and
a metal piece disposed on the at least one of the upper and lower surfaces of the polymer film and electrically connected to the aluminum conductive material,
wherein the aluminum conductive material serves as an electrochemical fuse or performs a function of blocking or reducing short-circuit current in the event of an internal short circuit or an external short circuit,
wherein the aluminum conductive material is disposed between the metal piece and the polymer film, and
wherein the metal piece is composed of aluminum foil or SUS 316L foil.

2. A current collector for a positive electrode, the current collector comprising:
a polymer film composed of a nonmetal or a nonconductor material; and
an aluminum conductive material configured to define an outermost surface of the current collector for the positive electrode by being formed or applied, with a thickness of 0.25 to 0.6 μm, onto at least one of upper and lower surfaces of the polymer film,
wherein in the event of an internal short circuit or an external short circuit, the aluminum conductive material reacts with an electrolyte and is corroded or broken in a thickness direction over an entire thickness of the aluminum conductive material so as to block a short-circuit current path or reduce short-circuit current,
wherein the aluminum conductive material includes a plurality of nano-sized pores, and
wherein a metal piece is disposed on a surface of the aluminum conductive material, an insulating polymeric layer is disposed on the at least one of the upper and lower surfaces of the polymer film that faces the metal piece, and a lead tab is joined or connected to the insulating polymeric layer facing the metal piece.

3. A current collector for a positive electrode, the current collector for a positive electrode comprising:
a polymer film composed of a nonmetal or a nonconductor material; and
an aluminum conductive material configured to define an outermost surface of the current collector for the positive electrode by being formed or applied, with a thickness of 0.25 to 0.6 μm, onto at least one of upper and lower surfaces of the polymer film,
wherein in the event of an internal short circuit or an external short circuit, an electric potential of the current collector decreases to a negative electrode electric potential, and the aluminum conductive material is corroded or broken in a thickness direction over an entire thickness so as to block a short-circuit current path or reduce short-circuit current,
wherein the aluminum conductive material includes a plurality of nano-sized pores, and
wherein a metal piece is disposed on the at least one of the upper and lower surfaces of the polymer film, an insulating polymeric layer is disposed on the at least one of the upper and lower surfaces of the polymer film that faces the metal piece, and a lead tab is joined or connected to the insulating polymeric layer facing the metal piece.

4. The current collector for a positive electrode of claim 1, comprising:
a lead tab joined or connected to the metal piece.

5. The current collector for a positive electrode of claim 1, wherein an insulating polymeric layer is disposed between the aluminum conductive material and the metal piece.

6. The current collector for a positive electrode of claim 1, wherein the aluminum conductive material formed or applied onto the surface of the polymer film includes a plurality of nano-sized pores.

7. The current collector for a positive electrode of claim 5, wherein the metal piece is disposed on a surface of the aluminum conductive material formed on the at least one of the upper and lower surfaces of the polymer film, the insulating polymeric layer is disposed on the surface of the aluminum conductive material formed or applied onto the at least one of the upper and lower surfaces of the polymer film that faces the metal piece, and a lead tab is joined or connected to the insulating polymeric layer that faces the metal piece.

8. The current collector for a positive electrode of claim 5, wherein the aluminum conductive material is disposed on the at least one of the upper and lower surfaces of the polymer film, and the aluminum conductive material, the insulating polymeric layer, and the metal piece are disposed on the same side with respect to the upper or lower surface of the polymer film.

9. The current collector for a positive electrode of claim 8, wherein a lead tab is joined or connected to the polymer film and disposed on the at least one of the upper and lower surfaces of the polymer film that faces the metal piece.

10. A current collector for a positive electrode, the current collector comprising:
a polymer film composed of a nonmetal or a nonconductor material;
an aluminum conductive material configured to define an outermost surface of the current collector for the positive electrode by being formed or applied, with a thickness of 0.25 to 0.6 µm, onto at least one of upper and lower surfaces of the polymer film;
a metal piece disposed on the at least one of the upper and lower surfaces of the polymer film and electrically connected to the aluminum conductive material; and
an insulating polymeric layer disposed on the at least one of the upper and lower surfaces of the polymer film that faces the metal piece,
wherein the aluminum conductive material serves as an electrochemical fuse or performs a function of blocking or reducing short-circuit current in the event of an internal short circuit or an external short circuit, and
wherein the aluminum conductive material is disposed between the insulating polymeric layer and the polymer film.

11. The current collector for a positive electrode of claim 10, comprising:
a lead tab joined or connected to the insulating polymeric layer.

12. The current collector for a positive electrode of claim 2, comprising:
a metal piece disposed on the at least one of the upper and lower surfaces of the polymer film and electrically connected to the aluminum conductive material,
wherein the aluminum conductive material is disposed between the metal piece and the polymer film.

13. A current collector for a positive electrode, the current collector comprising:
a polymer film composed of a nonmetal or nonconductor material;
an aluminum conductive material configured to define an outermost surface of the current collector for the positive electrode by being formed or applied, with a thickness of 0.25 to 0.6 µm, onto at least one of upper and lower surfaces of the polymer film;
a metal piece disposed on the at least one of the upper and lower surfaces of the polymer film and electrically connected to the aluminum conductive material; and
an insulating polymeric layer disposed on the at least one of the upper and lower surfaces of the polymer film that faces the metal piece,
wherein in the event of an internal short circuit or an external short circuit, the aluminum conductive material reacts with an electrolyte and is corroded or broken in a thickness direction over an entire thickness of the aluminum conductive material so as to block a short-circuit current path or reduce short-circuit current, and
wherein the conductive material is disposed between the insulating polymeric layer and the polymer film.

14. The current collector for a positive electrode of claim 3, comprising:
a metal piece disposed on the at least one of the upper and lower surfaces of the polymer film and electrically connected to the aluminum conductive material,
wherein the aluminum conductive material is disposed between the metal piece and the polymer film.

* * * * *